United States Patent
Taskila et al.

(10) Patent No.: US 7,841,899 B2
(45) Date of Patent: Nov. 30, 2010

(54) CONDUCTIVE SLEEVE FOR USE IN RADIO FREQUENCY SYSTEMS

(75) Inventors: Jari Taskila, Shakopee, MN (US); Stephen J. Qualy, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1282 days.

(21) Appl. No.: 11/370,557

(22) Filed: Mar. 8, 2006

(65) Prior Publication Data

US 2007/0159804 A1 Jul. 12, 2007

Related U.S. Application Data

(60) Provisional application No. 60/752,786, filed on Dec. 22, 2005.

(51) Int. Cl.
H05K 9/00 (2006.01)

(52) U.S. Cl. .................. 439/581; 174/362; 333/182; 439/507

(58) Field of Classification Search .......... 439/607, 439/366, 581, 620.03, 675, 507; 333/191, 333/181–185, 167, 12; 361/302, 818, 800, 361/816; 336/192; 174/525, 395, 377, 359, 174/360, 362
See application file for complete search history.

(56) References Cited

U.S. PATENT DOCUMENTS

| | | | | | |
|---|---|---|---|---|---|
| 2,019,939 | A | * | 11/1935 | Suller | 455/341 |
| 2,046,927 | A | * | 7/1936 | Riley | 361/814 |
| 2,130,243 | A | * | 9/1938 | Mitchell | 174/395 |
| 2,259,234 | A | | 10/1941 | Voigt | |
| 2,383,890 | A | * | 8/1945 | Robinson | 333/182 |
| 2,581,967 | A | * | 1/1952 | Mitchell | 439/85 |
| 2,745,895 | A | * | 5/1956 | Lideen | 174/395 |
| 2,816,948 | A | * | 12/1957 | Twigg, Jr. | 174/395 |
| 2,840,793 | A | * | 6/1958 | Sunko et al. | 439/608 |
| 2,888,658 | A | * | 5/1959 | Welch | 439/366 |
| 2,911,458 | A | * | 11/1959 | McKee | 174/395 |
| 2,958,063 | A | * | 10/1960 | Stanwyck | 439/82 |
| 3,035,237 | A | * | 5/1962 | Schlicke | 333/182 |
| 3,036,145 | A | * | 5/1962 | Murphy | 174/395 |
| 3,076,947 | A | * | 2/1963 | Davidson, Jr. | 333/181 |
| 3,191,131 | A | * | 6/1965 | Adams et al. | 333/167 |
| 3,227,973 | A | * | 1/1966 | Gray | 333/177 |
| 3,243,738 | A | * | 3/1966 | Schlicke et al. | 333/182 |
| 3,267,396 | A | * | 8/1966 | Scott | 333/167 |
| 3,292,117 | A | * | 12/1966 | Bryant et al. | 333/260 |

(Continued)

FOREIGN PATENT DOCUMENTS

DE 10102456 5/2002

*Primary Examiner*—Neil Abrams
(74) *Attorney, Agent, or Firm*—Fogg & Powers LLC

(57) ABSTRACT

An apparatus including a conductive sleeve including an outer-conductive surface and an inner passageway that extends from a first end at least partially to a second end. The passageway is adapted to receive and shield a device that provides at least one of a radio frequency path and an electrical current path. In one embodiment, movable flanges at an end of the sleeve are used for coupling the outer-conductive surface of the sleeve to a ground connection. In one embodiment, the sleeve may further be used to interconnect a pair of RF structures with ground connections at each end of the sleeve and with signal connections to the device at each end.

28 Claims, 14 Drawing Sheets

U.S. PATENT DOCUMENTS

| | | | |
|---|---|---|---|
| 3,435,387 A * | 3/1969 | Reinke et al. | 333/183 |
| 3,579,156 A | 5/1971 | Parfitt | |
| 3,656,072 A * | 4/1972 | Ludwig et al. | 333/260 |
| 3,854,107 A * | 12/1974 | Tuchto et al. | 333/183 |
| 4,531,109 A * | 7/1985 | Olsen | 336/87 |
| 4,747,019 A * | 5/1988 | Ito et al. | 361/816 |
| 4,753,611 A * | 6/1988 | Kobler | 439/578 |
| 4,791,236 A | 12/1988 | Klein et al. | |
| 4,820,174 A * | 4/1989 | Farrar et al. | 439/95 |
| 4,925,403 A * | 5/1990 | Zorzy | 439/578 |
| 5,398,163 A | 3/1995 | Sano | 361/749 |
| 5,796,323 A * | 8/1998 | Uchikoba et al. | 333/260 |
| 5,974,139 A | 10/1999 | McNamara et al. | |
| 6,018,278 A * | 1/2000 | Tang | 333/100 |
| 6,118,072 A * | 9/2000 | Scott | 174/525 |
| 6,165,019 A * | 12/2000 | Kha et al. | 439/620.03 |
| 6,188,016 B1 * | 2/2001 | Enstrom et al. | 174/359 |
| 6,411,180 B1 * | 6/2002 | Henningsson et al. | 333/202 |
| 6,490,171 B2 * | 12/2002 | Sievers et al. | 361/800 |
| 6,911,942 B2 | 6/2005 | Fukuda et al. | |
| 7,012,496 B2 * | 3/2006 | Sugiura et al. | 336/92 |
| 7,097,499 B1 * | 8/2006 | Purdy | 439/578 |
| 7,154,050 B2 * | 12/2006 | Sekijima et al. | 174/369 |
| 7,442,084 B2 * | 10/2008 | Montena | 439/620.03 |
| 2002/0195260 A1 | 12/2002 | Marks | |

* cited by examiner

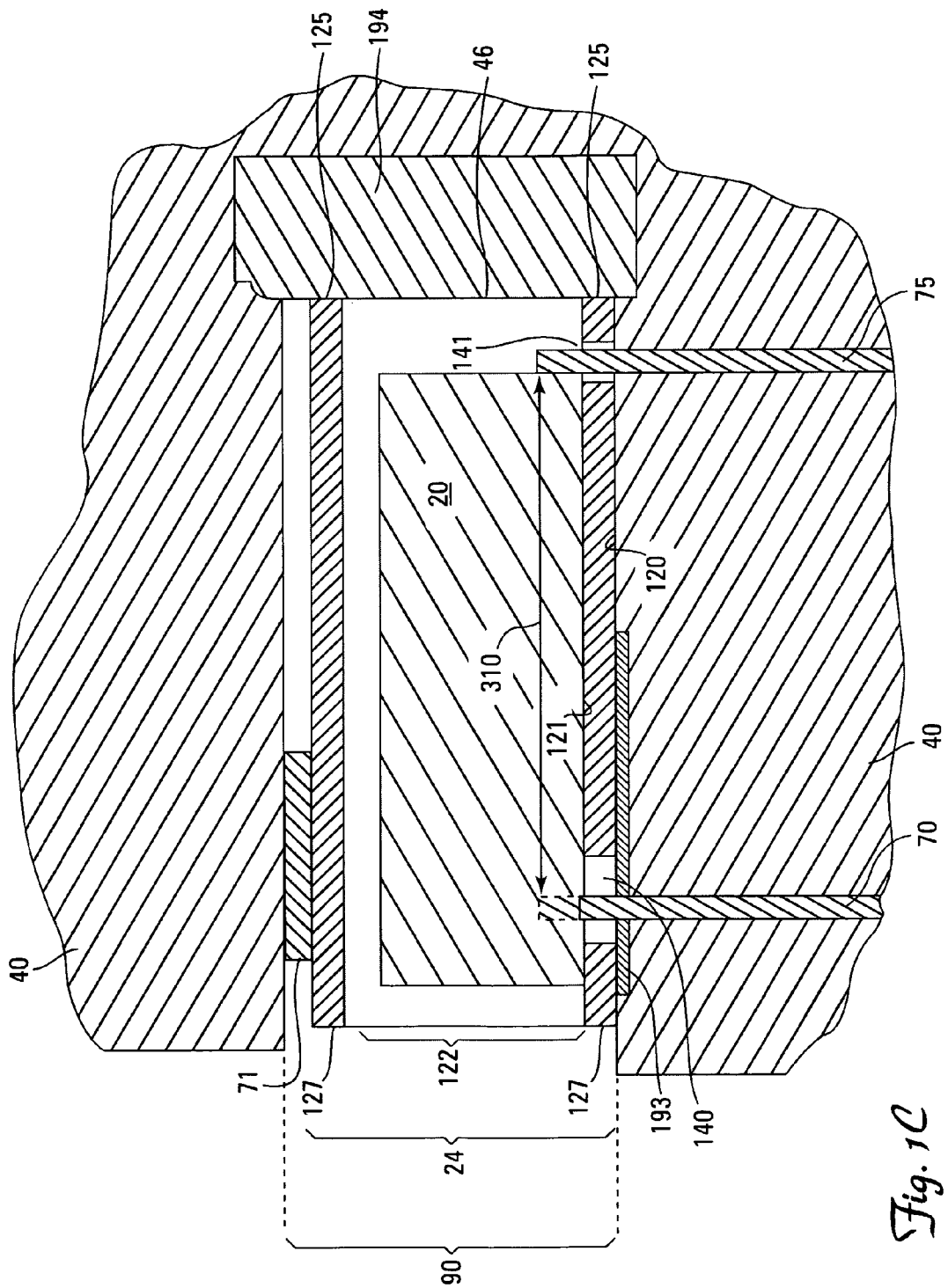

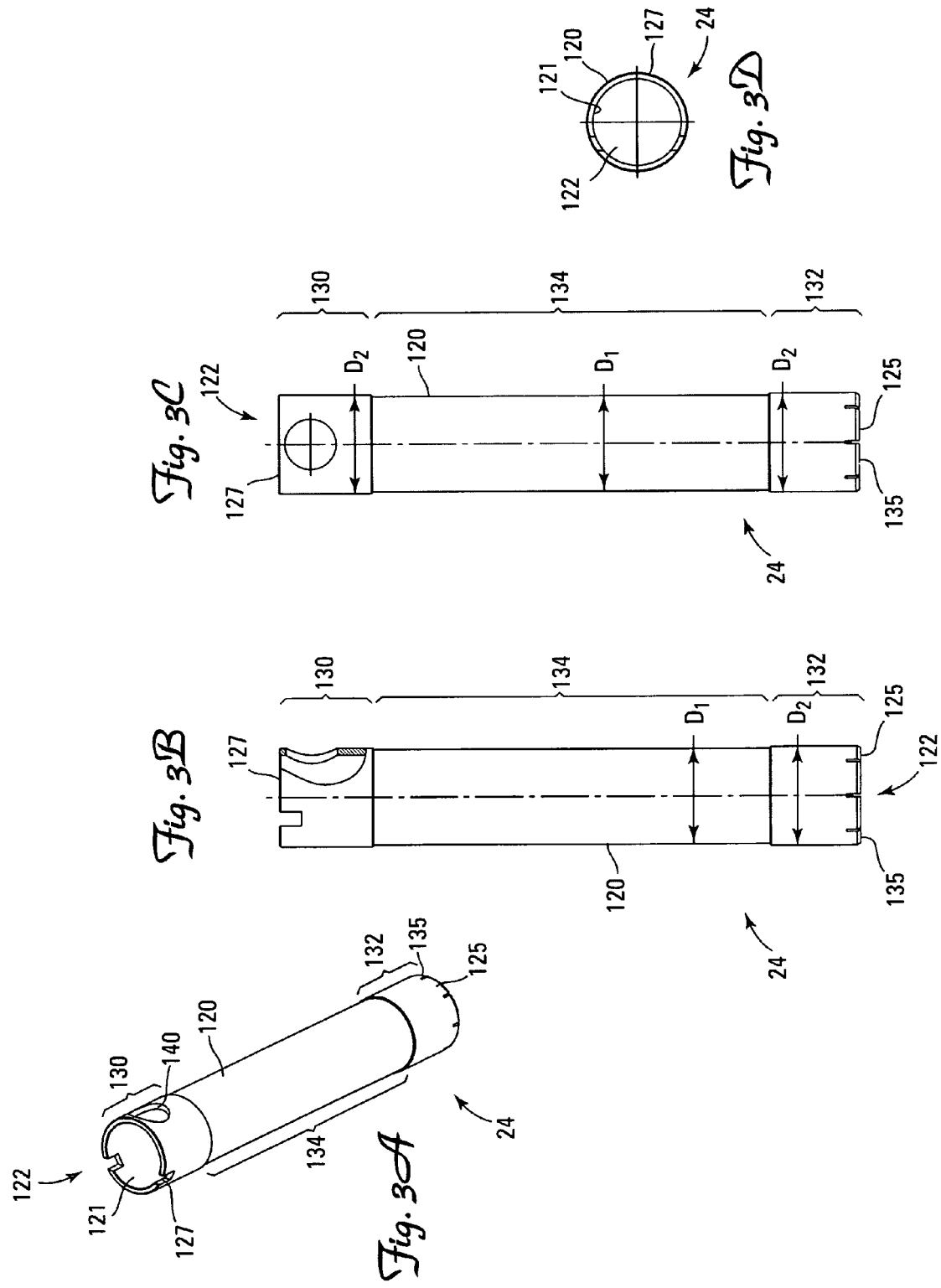

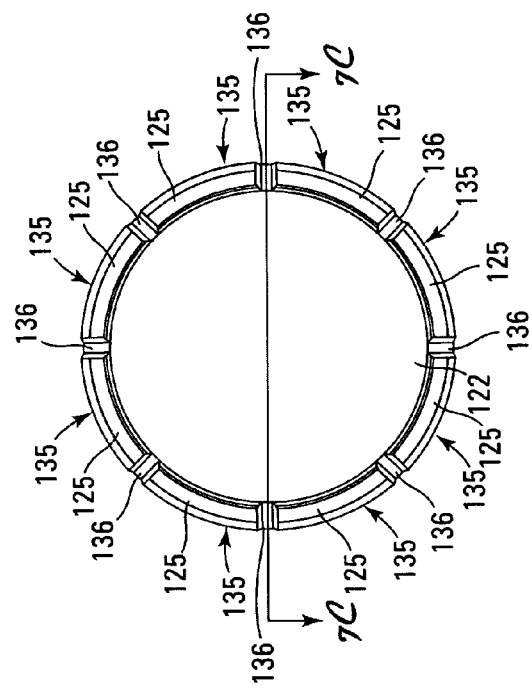
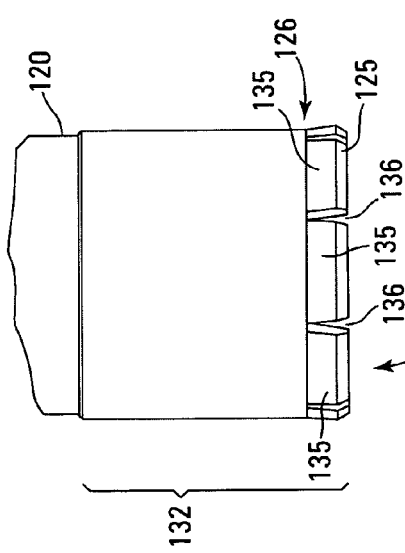
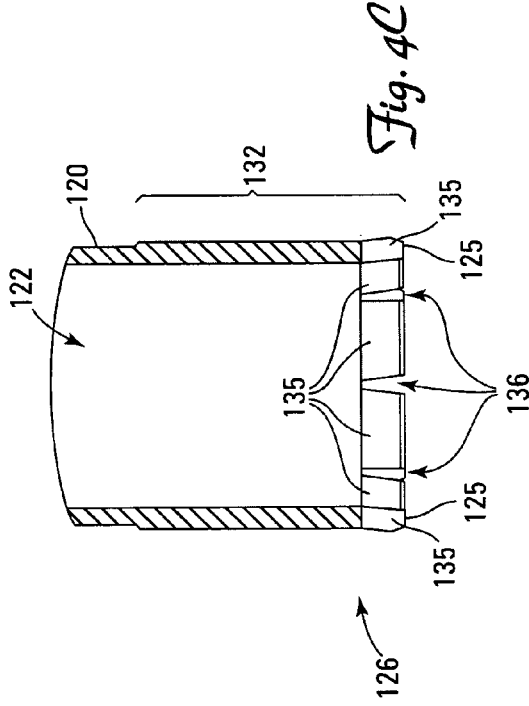

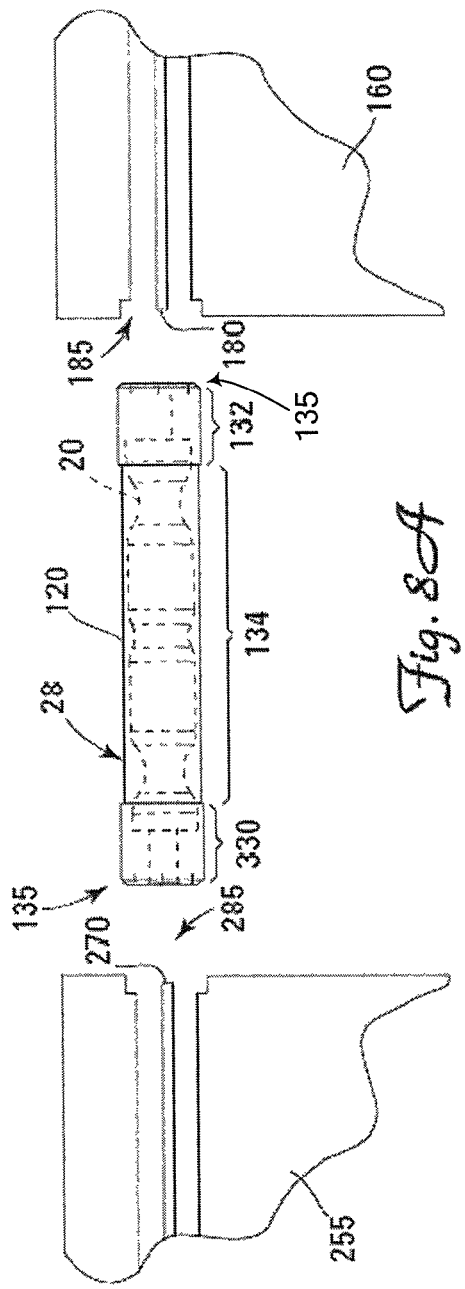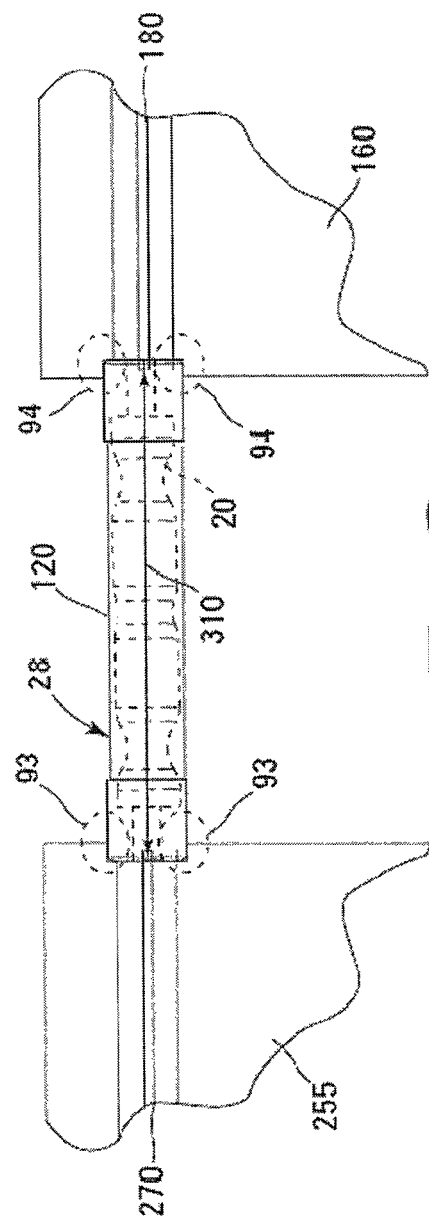

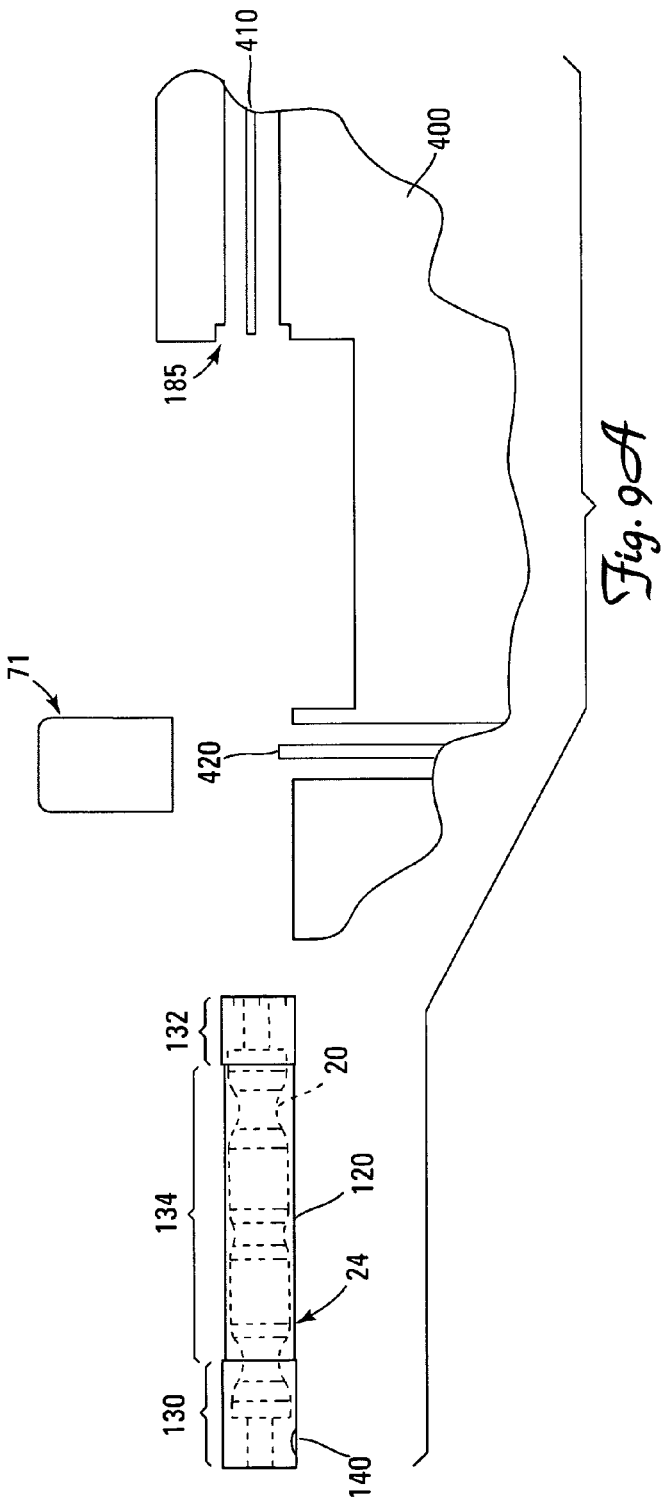
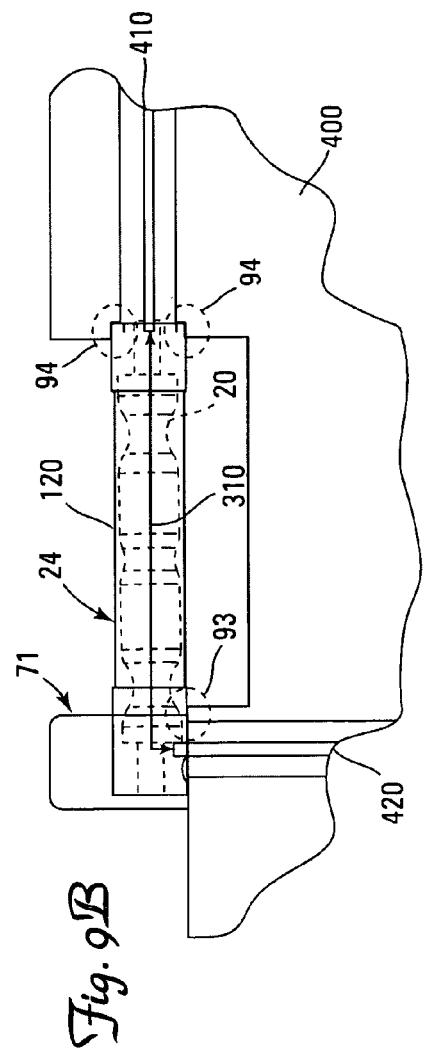
Fig. 9A
Fig. 9B

US 7,841,899 B2

CONDUCTIVE SLEEVE FOR USE IN RADIO FREQUENCY SYSTEMS

RELATED APPLICATIONS

This application claims the benefit under 35 USC 119(e) of prior provisional application 60/752,786, filed Dec. 12, 2005, which is incorporated herein in its entirety by reference.

BACKGROUND

Radio frequency systems often include at least one radio frequency device that needs to be incorporated with other devices. Some radio frequency systems require that a radio frequency device is incorporated with one or more other radio frequency devices. The devices often need to be electrically isolated from each other for optimal system operation. In one exemplary system, the antennae in base stations of communication systems often receive more than one signal in more than one spectral range. In order to separate the different signals, the communication systems incorporate radio frequency filter systems such as a low pass filter and a resonant cavity of a band pass filter. A low pass filter is fixed and grounded inside a passageway of the resonant cavity of the band pass filter. In such filters, a stable contact between the low pass filter and the band pass filter is critical.

The technology to manufacture such radio frequency systems includes machining the body of a band pass filter out of a solid piece with a passageway in which the low pass filter is inserted. The passageway is positioned so that the filters share a common ground. Machining the body of a band pass filter out of a solid piece is an expensive process. It is less expensive to manufacture the body of the band pass filter by die casting the body. The die cast manufacturing process requires that the slot for the low pass filter be electroplated to adequately ground the low pass filer to the ground of the band pass filter. Electroplating in the closed area is difficult and often produces holes in the metallic layer so the ground is not adequate for the radio frequency system.

Assuring proper grounding of devices such as low pass filters is also problematic in other contexts.

SUMMARY

The embodiments of the present invention provide an inexpensive, reliable system for assuring proper grounding of a low pass filter and will be understood by reading and studying the following specification.

One aspect of the present invention provides an apparatus including a conductive sleeve that has an outer-conductive surface and an inner passageway that extends from a first end at least partially to a second end. The passageway is adapted to receive and shield a device that provides at least one of a radio frequency path and an electrical current path.

Another aspect of the present invention provides a method to electrically isolate a device. The method includes inserting the device into a conductive sleeve and grounding an outer-conductive surface of the conductive sleeve to a ground contact of a radio frequency device near at least one of a radio frequency path and an electrical current path for the device.

Another aspect of the present invention provides a method to electrically isolate a second radio frequency device. The method includes inserting a conductive sleeve into a first radio frequency device, the conductive sleeve operable to hold the second radio frequency device and grounding the conductive sleeve to a ground of the first radio frequency device.

Another aspect of the present invention includes a system to shield a device. The system includes means for grounding a conductive sleeve with a first radio frequency device and means for retaining the device within the conductive sleeve.

Another aspect of the present invention includes an apparatus including a non-conductive material with an inner passageway extending at least partially through a length of the non-conductive material and a conductive layer formed on an exterior surface of the non-conductive material, wherein the non-conductive material and the conductive layer form a sleeve adapted to receive a device.

Another aspect of the present invention includes an apparatus including a sleeve including an outer-conductive surface and an inner passageway that extends from a first end to a second end. The passageway is adapted to receive a first radio frequency device. The sleeve shields the first radio frequency device when the outer-conductive surface is operably attached to a ground in a second radio frequency device.

DRAWINGS

Embodiments of the present invention can be more easily understood and further advantages and uses thereof more readily apparent, when considered in view of the description of the preferred embodiments and the following figures in which:

FIGS. 1A-1C illustrate block diagram views of a radio frequency system in accordance with one embodiment of the present invention.

FIGS. 3A-3D illustrate views of a conductive sleeve according to one embodiment of the present invention.

FIGS. 4A-4C illustrate views of a second-end portion of the conductive sleeve according to an embodiment of the present invention.

FIG. 8A illustrates an exploded view of relative positions of a conductive sleeve, a device, a first radio frequency device and a second radio frequency device according to an embodiment of the present invention.

FIG. 8B illustrates the operably positioned conductive sleeve, device, first radio frequency device and second radio frequency device of FIG. 8A according to an embodiment of the present invention.

FIG. 9A illustrates an exploded view of relative positions of a conductive sleeve, a device, and at least a first radio frequency device according to an embodiment of the present invention.

FIG. 9B illustrates the operably positioned conductive sleeve, device and at least first radio frequency device of FIG. 9A according to an embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

Figure 1A:
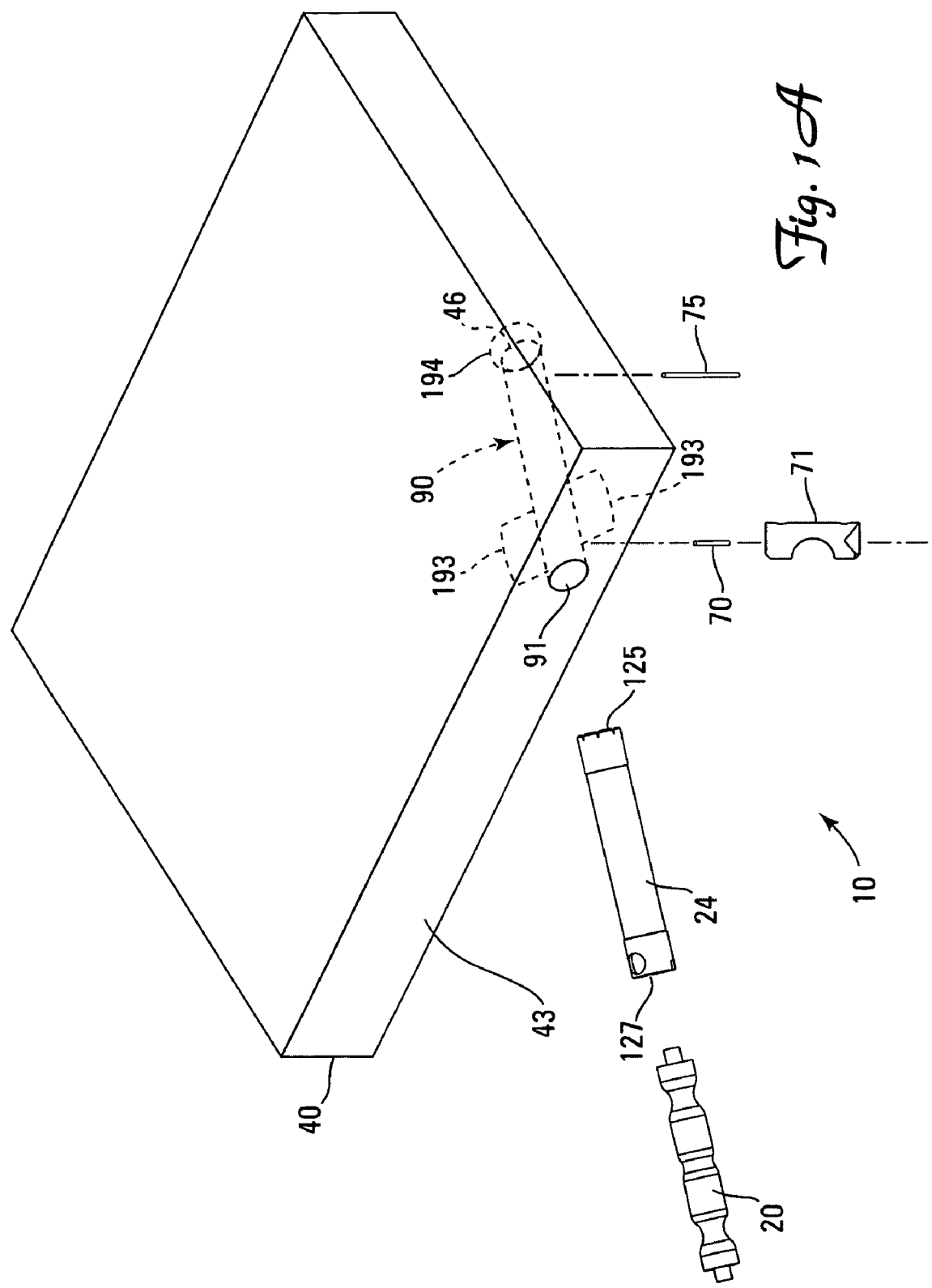
Figure 1B:
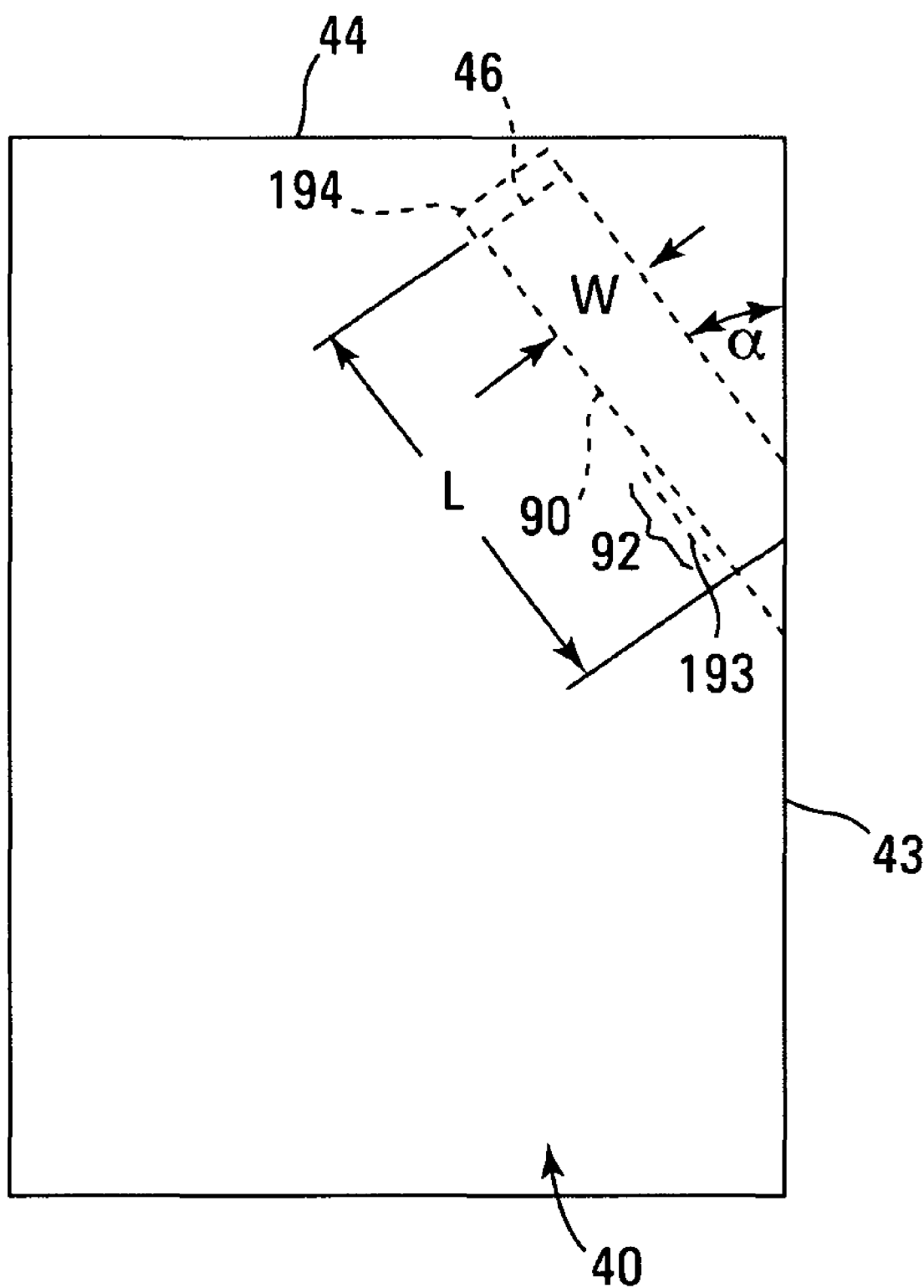

FIGS. 1A-1C illustrate block diagram views of a radio frequency system in accordance with one embodiment of the present invention. FIG. 1A illustrates an exploded view of relative positions of the components of system 10 according to an embodiment of the present invention. FIG. 1B illustrates a top view of the first radio frequency device 40 in accordance with one embodiment of the present invention. FIG. 1C illustrates a side-cross-sectional view of a cavity 90 in the first radio frequency device 40 in which the conductive sleeve 24 and the device 20 are positioned.

The illustrated components of system 10 include a device 20, the first radio frequency device 40 (FIG. 1A), an input/output connector 70, an input/output connector 75 and a securing bracket 71 for attaching the conductive sleeve 24 in the cavity 90 of grounded first radio frequency device 40 according to an embodiment of the present invention.

As shown in FIGS. 1A and 1B, the first radio frequency device 40 includes the cavity 90. Cavity 90 is adapted to hold a device 20 inside a conductive sleeve 24. The cavity 90 has a width W, a central length L (FIG. 1B), and an angle α (FIG. 1B) with respect to side 43. Other widths, lengths and angles are possible. The opening to the cavity 90 is indicated by the arrow 91 (FIG. 1A).

At least a portion of the surface of the cavity 90 includes a first ground 193 and a second ground 194 of the grounded first radio frequency device 40. The first ground 193 is also referred to here as "first ground contact 193." The second ground 194 is also referred to here as "second ground contact 194." The conductive sleeve 24 that houses the device 20 is inserted into the cavity 90 in contact with the second ground 194 and the first ground 193 of the first radio frequency device 40. In one implementation of this embodiment, the second ground 194 and the first ground 193 are a common ground on the ground plane of the first radio frequency device 40. In another implementation of this embodiment, the cavity 90 is a grounding plate.

As shown in FIG. 1C, the device 20, the conductive sleeve 24, the securing bracket 71, the input/output connector 70 and input/output connector 75 are operably positioned in the cavity 90. The conductive sleeve 24 includes an outer-conductive surface 120 and an inner passageway 122 that extends from a second end 125 to a first end 127. The inner surface 121 of the inner passageway 122 encircles the device 20.

The input/output connector 70 goes through the hole 140 (FIG. 1C) that extends from the outer-conductive surface 120 of the conductive sleeve 24 to an inner surface 121 of the conductive sleeve 24 to make contact with the device 20. Likewise the input/output connector 75 goes through the hole 141 (FIG. 1C) that extends from the outer-conductive surface 120 of the conductive sleeve 24 to an inner surface 121 of the conductive sleeve 24 to make contact with the device 20. In this manner input/output connector 70 and input/output connector 75 are operable to electrically connect to the device 20 and to provide a portion of a radio frequency path 310 or an electrical current path 310. The numerical indicator 310 in the accompanying drawings and as used in this document indicate either a radio frequency path or an electrical current path as will be understandable by one skilled in the art. If the device 20 is a radio frequency device, the path 310 is a radio frequency path. If the device 20 is an electronic or opto-electronic device, the path 310 is an electrical current path. In one implementation of this embodiment, the input/output connector 75 is not included in the system 10.

The securing bracket 71 partially encircles a portion of the outer-conductive surface 120 near the hole 140. The securing bracket 71 provides pressure to hold the conductive sleeve 24 securely in place within the first radio frequency device 40. The securing bracket 71 attaches the conductive sleeve 24 to the radio frequency device 40 in contact with the first ground contact 193 and with the second ground contact 194.

The conductive sleeve 24 contacts the first ground contact 193 in the first radio frequency device 40, while the first ground contact 193 is in proximity to the at least one of the radio frequency path 310 and the electrical current path 310. Likewise, the conductive sleeve 24 contacts the second ground 194 in the first radio frequency device 40 while the second ground contact 194 is in proximity to the radio frequency path 310 or the electrical current path 310. Other configurations for conductive sleeves to contact a ground in respective radio frequency device are described below with reference to FIGS. 7A, 7B, 8A, 8B, 9A and 9B One implementation of this embodiment of the radio frequency system 10 does not include the securing bracket 71. In another implementation of this embodiment of the radio frequency system 10, the device 20 is a filter that needs to be shielded. In another implementation of this embodiment, the first radio frequency device 40 is a band pass filter. Such a band pass filter comprises, in one embodiment, a tunable cavity filter. The cavity filter portion of first radio frequency device 40 is constructed using existing or later-developed techniques. In another implementation of this embodiment, a device 20 and first radio frequency device 40 are electrically connected in parallel when positioned as illustrated in FIG. 1C. In another implementation of this embodiment, the radio frequency device 40 is a band pass filter operably connected to a radio frequency antenna and the device 20 comprises a low pass filter electrically connected in parallel to the band pass filter 40, wherein the low pass filter and the band pass filter are adapted to separate spectrally distinct radio frequency signals.

In another implementation of this embodiment, the device 20 is a radio frequency device. In another implementation of this embodiment, of this embodiment, the device 20 is a radio frequency low pass filter. In another implementation of this embodiment, the device 20 is one of an active electrical circuit, a passive electrical circuit, an active electro-optical circuit, a passive electro-optical circuit, an electrical element, an optical element, a radio frequency device, band pass filter, a band stop, a low pass filter, a notch filter, a printed circuit board, radio frequency traces, lasers, light emitting diodes, a straight pin and combinations thereof. In one implementation of this embodiment, the conductive sleeve is a conductive ductile material operable to cover the device in a shielding manner.

Figure 2:
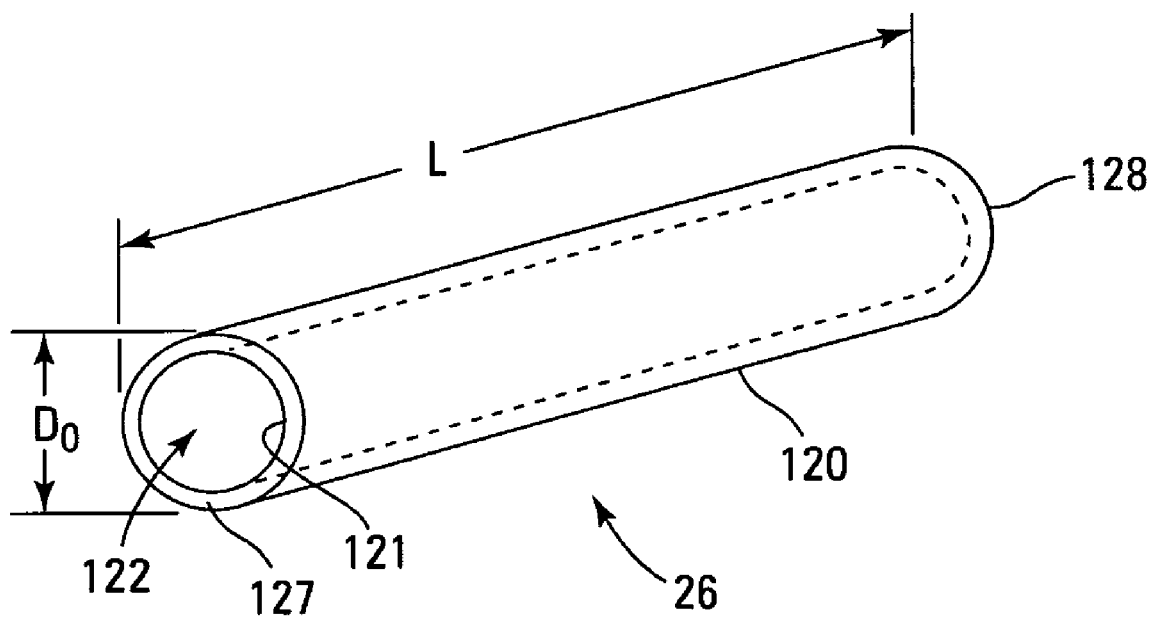
FIG. 2 illustrates an oblique view of a conductive sleeve according to one embodiment of the present invention.

FIG. 2 illustrates an oblique view of a conductive sleeve 26 according to one embodiment of the present invention. The conductive sleeve 26 has an outer-conductive surface 120 and an inner passageway 122 that partially extends from a first end 127 to a second end 128. The second end 128 is closed unlike the second end 125 of conductive sleeve 24. The inner passageway 122 is enclosed by the inner surface 121. The outer diameter $D_o$ of the conductive sleeve 24 is less than the width W (FIG. 1B) of the cavity 90. The length of the conductive sleeve 24 is less than the length L (FIG. 1B) of the cavity 90 so that the conductive sleeve 24 fits completely within the cavity 90 of the first radio frequency device 40.

In this illustrated embodiment of sleeve 26, the outer-conductive surface 120 is cylindrical. Other shapes are possible. In this illustrated embodiment of sleeve 26, the inner passageway 122 is cylindrical. Other shapes are possible. In this illustrated embodiment of sleeve 26, there is no hole on the side surface 120 of the sleeve 26 from the outer-conductive surface 120 to the inner surface 121. In one implementation of this embodiment, there are one or more holes on the side surface 120 of the sleeve 26 from the outer-conductive surface 120 to the inner surface 121.

FIGS. 3A-3D illustrate views of the conductive sleeve 24 according to one embodiment of the present invention. FIG. 3A illustrates an oblique view of the conductive sleeve 24. FIG. 3B illustrates a first side view of the conductive sleeve 24. FIG. 3C illustrates a second side view of the conductive sleeve 24 in which the second side view is rotated 90 degrees from the first side view of FIG. 3B. FIG. 3D illustrates a top view of the outward first end 127 of conductive sleeve 24. The inner passageway 122 is designed to receive the device 20 (FIGS. 1A and 1C).

The conductive sleeve 24 has an outer-conductive surface 120 and an inner passageway 122 that extends from the second end 125 to the first end 127. The second end 125 is open. The conductive sleeve 24 includes a first-end portion 130, a second-end portion 132 and a main body portion 134. The first-end portion 130 is near the first end 127. The first-end portion 130 includes a hole 140 that extends from the outer-conductive surface 120 of the conductive sleeve 24 to an inner surface 121 of the conductive sleeve 24. The input/output connector 70 extends through the hole 140 and is in electrical contact with the radio device 20 (FIGS. 1A and 1C).

The outer diameter of the conductive sleeve 24 is less than the width W (FIG. 1B) of the cavity 90. The length of the conductive sleeve 24 is less than the length L (FIG. 1B) of the cavity 90 so that the conductive sleeve 24 fits completely within the cavity 90 of the first radio frequency device 40. As shown in FIGS. 3A-3C, the outer diameter $D_1$ (FIGS. 3B-3C) of the main body portion 134 is slightly smaller than the outer diameter $D_2$ (FIGS. 3B-3C) of the first-end portion 130 and the second-end portion 132. In one implementation of this embodiment, the outer diameter $D_1$ of the main body portion 134 equals the outer diameter $D_2$ of the first-end portion 130 and/or the second-end portion 132. The conductive sleeve 24 includes movable flanges 135 at the second-end portion 132 of the conductive sleeve 24.

In this illustrated embodiment of sleeve 24, the outer-conductive surface 120 is cylindrical. Other shapes are possible FIGS. 4A-4C illustrate views of the second-end portion 132 of the conductive sleeve 24 according to an embodiment of the present invention. FIG. 4A illustrates a side view of the second-end portion 132 including flanges 135. FIG. 4B illustrates an enlarged view of the second end 125 of conductive sleeve 24. FIG. 4C illustrates a cross-sectional side view of the second-end portion 132 and flanges 135.

As shown in FIG. 4B, eight movable flanges 135 encircle the inner passageway 122. In other implementations of this embodiment, more than eight movable flanges or fewer than eight movable flanges are located at the second end 125 of the conductive sleeve 24. The second end 125 of the conductive sleeve 24 is located on the outward end surfaces of the flanges 135. The flanges 135 are attached to the first-end portion 130 at a crease-portion 126. Gaps 136 between neighboring flanges 135 provide room for the flanges 135 to inwardly bend about the crease-portion 126 by a small angle. In one implementation of this embodiment, the flanges 135 bend by less than one degree about the crease portion 126. In another implementation of this embodiment, the flanges 135 bend by less than five degrees about the crease portion 126. The gaps 136 are designed to allow limited bending of the flanges 135. When the conductive sleeve 24 (FIGS. 3A-3D) is inserted into the cavity 90 (FIGS. 1A-1C) the second end 125 of the flanges 135 bend slightly inward and the flat inward ends 125 are pushed parallel to the flat surface 46 (FIGS. 1A and 1B) of the first radio frequency device 40. The surface 46 of the first radio frequency device 40 includes second ground 194 (FIGS. 1B and 1C) and the outer-conductive surface of the conductive sleeve 24 is grounded when the flat inward ends 125 are pushed against ground 194 in the flat surface 46. In this manner, the flanges 125 stably contact the second ground contact 194 in the first radio frequency device 40, wherein the second ground contact 194 is in contact with the outer-conductive surface 120 and in proximity to the at least one of the radio frequency path and the electrical current path 310. As shown in FIG. 4B, the movable flanges 135 are bent inward.

Figure 5A:
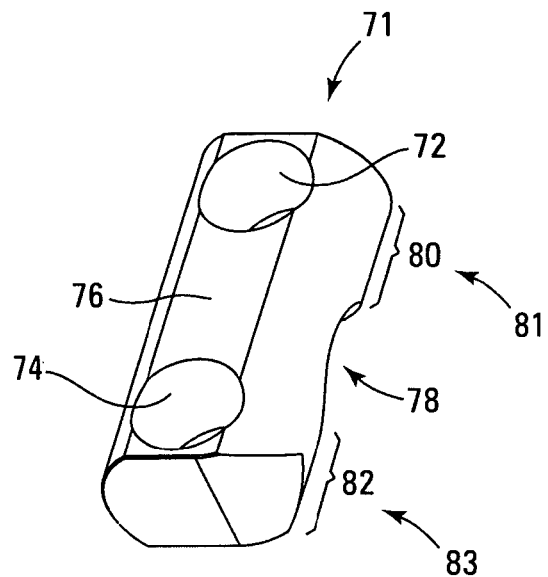
FIGS. 5A-5D illustrate views of a securing bracket operable to attach the conductive sleeve to a grounded radio frequency device according to an embodiment of the present invention.
Figure 5B:
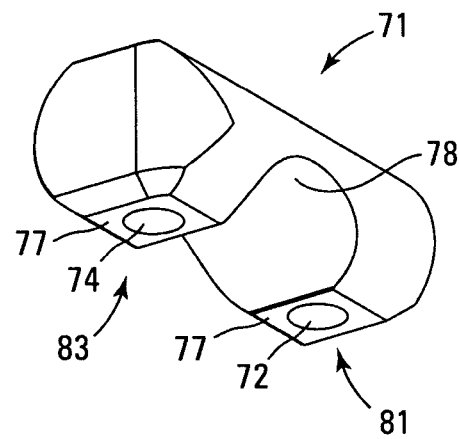
Figure 5C:
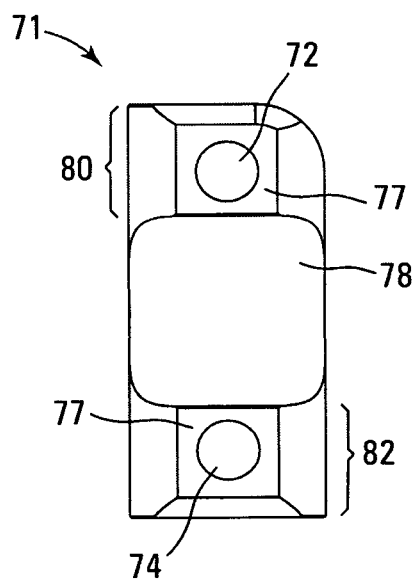
Figure 5D:
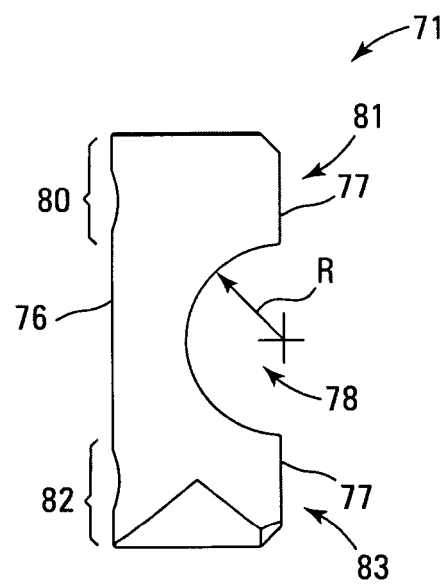

FIGS. 5A-5D illustrate views of a securing bracket 71 operable to ground the device 20 with the first radio frequency device 40 according to an embodiment of the present invention. FIG. 5A illustrates a first oblique view of the securing bracket 71. FIG. 5B illustrates a second oblique view of the securing bracket 71. FIG. 5C illustrates a bottom view of the securing bracket 71. FIG. 5D illustrates a side view of the securing bracket 71 in which the bottom face 77 is facing to the right.

In the illustrated embodiment, the securing bracket 71 includes an inset 78 having a shape that conforms to the shape of the outer-conductive surface 120 at the first-end portion 130 of the conductive sleeve 24. The inset 78 is inset into the bottom face 77 of the securing bracket 71. As shown in FIGS. 5A-5D, the inset 78 is a radial inset having a radius of curvature R that conforms to the radius of curvature $D_2/2$ (FIGS. 3B and 3C) of the outer-conductive surface 120 at a first-end portion 130 of the conductive sleeve 24. Specifically, R is about equal to $D_2/2$.

The inset 78 separates the body of the securing bracket 71 into a first-side region 80 positioned at a first side 81 of the radial inset 78 and a second-side region 82 positioned at a second side 83 of the radial inset 78.

The securing bracket 71 includes holes 72 and 74, which receive attachment fixtures, such as screws, attachment pins and the like. The attachment fixtures fixedly attach the securing bracket 71 to the first radio frequency device 40. The hole 72 is located in the first-side region 80 of the securing bracket 71. The hole 74 is located in the second-side region 82 of the securing bracket 71. The securing bracket 71 is formed from materials such as metals and/or plastics.

When the conductive sleeve 24 is positioned in the of the first radio frequency device 40 as shown in FIG. 1A, the first-end portion 130 of the conductive sleeve 24 is partially encircled by the inset 78 of the securing bracket 71. The attachment fixtures are positioned through holes 72 and 74 so that the inset 78 of the securing bracket 71 contacts the first-end portion 130 of the outer-conductive surface 120 in order to hold the conductive sleeve 24 in the first radio frequency device 40.

Figure 6:
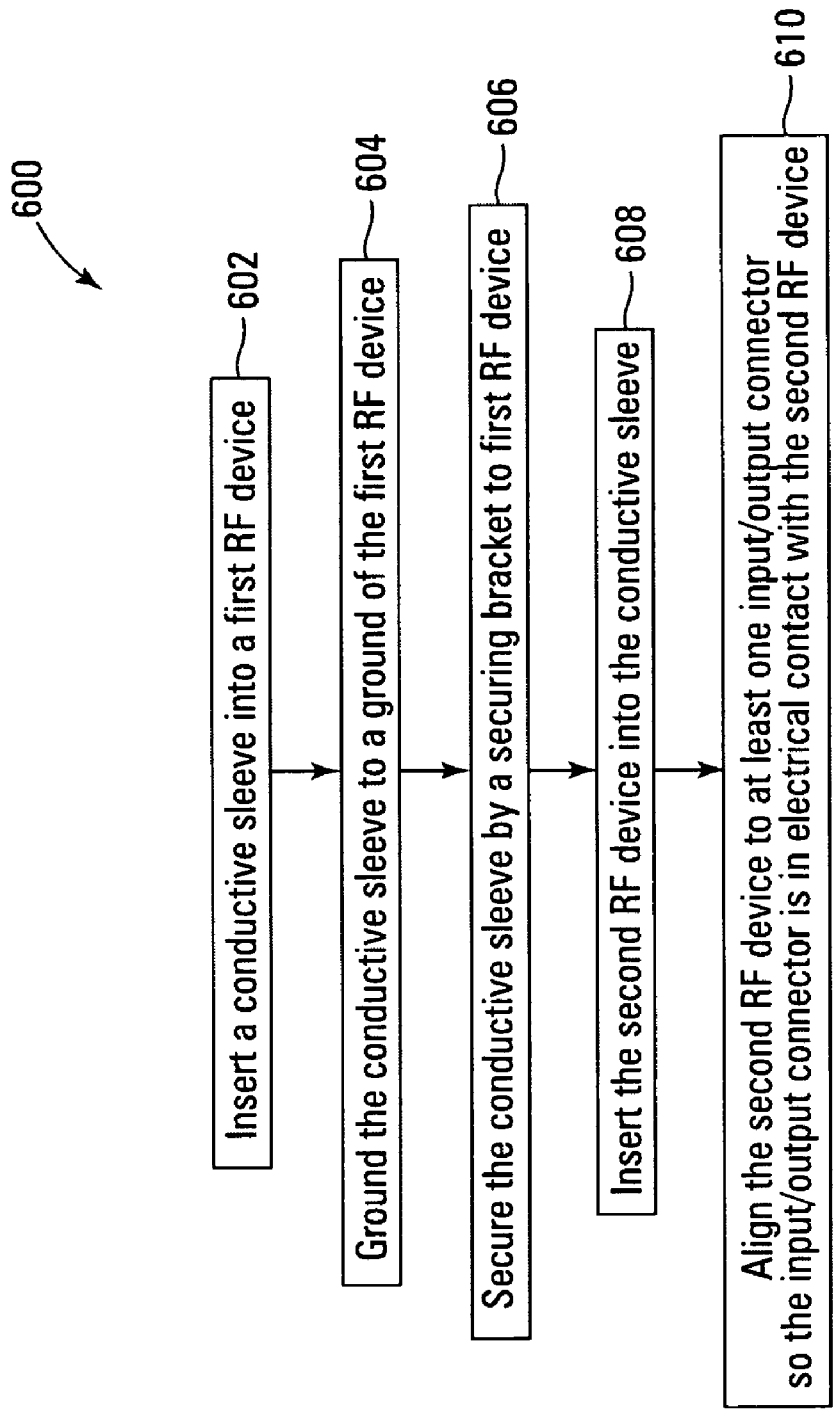
FIG. 6 is a flow diagram of one embodiment of a method to electrically isolate a radio frequency device.

FIG. 6 is a flow diagram 600 of a method to electrically isolate a radio frequency device. The following discussion of flow diagram 600 is related to exemplary first radio frequency device 40, securing bracket 71, and conductive sleeve 24 as shown in FIGS. 1A-1C and FIGS. 3-5. In an exemplary embodiment, the device 20 is a second radio frequency device 20. The following discussion of flow diagram 600 is applicable to other embodiments of the radio frequency assemblies, securing brackets and conductive sleeves.

At block 602, the conductive sleeve 24 is inserted into a cavity 90 (FIGS. 1A-1C) of a first radio frequency (RF) device 40. The conductive sleeve 24 is operable to hold a second radio frequency device 20.

At block 604, the conductive sleeve 24 is grounded to a ground, such as first ground 193 and/or second ground 194, of the first radio frequency device 40. Grounding occurs when the outer-conductive surface 120 touches the first ground 193 and/or second ground 194.

At block 606, the securing bracket 71 secures the conductive sleeve 24 to the first radio frequency device 40. In one implementation of this embodiment, the securing bracket 71 secures the conductive sleeve 24 so that the outer-conductive surface 120 is touching first ground 193 and/or second ground 194 of the first radio frequency device 40.

At block 608, the second radio frequency (RF) device 20 (FIG. 1C) is inserted into the conductive sleeve 24 that is positioned within the first radio frequency device 40. In one implementation of this flow diagram 600, the second radio frequency device 20 is positioned within the conductive sleeve 24 and then the second radio frequency device 20 and conductive sleeve 24 are inserted, as a unit, within the first radio frequency device 40.

At block 610, the second radio frequency device 20 is aligned to at least one input/output connector 70, so the input/output connector 70 is in electrical contact with the second radio frequency device 20.

In this manner, the conductive sleeve 24 is grounded to form a stable first ground contact with the first radio frequency device 40 while the device 20 is electrically isolated from the first radio frequency device 40. In another implementation of this flow diagram 600, a device other than the second radio frequency device 20 of this exemplary embodiment is electrically isolated from the first radio frequency device 40.

Figure 7A:
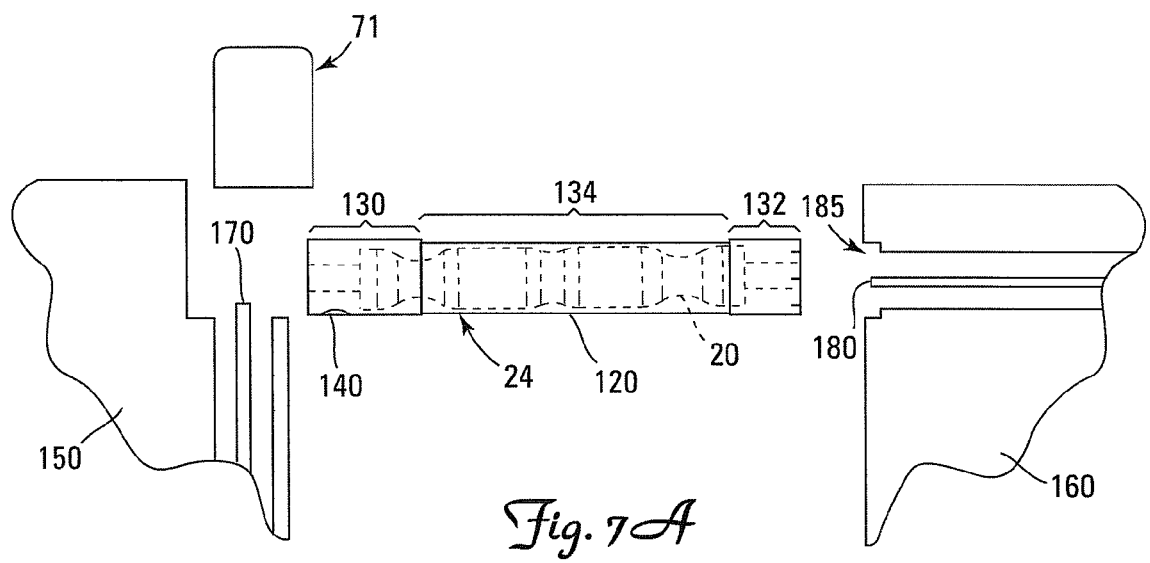
FIG. 7A illustrates an exploded view of relative positions of a conductive sleeve, a device, a first radio frequency device and a second radio frequency device according to an embodiment of the present invention.
Figure 7B:
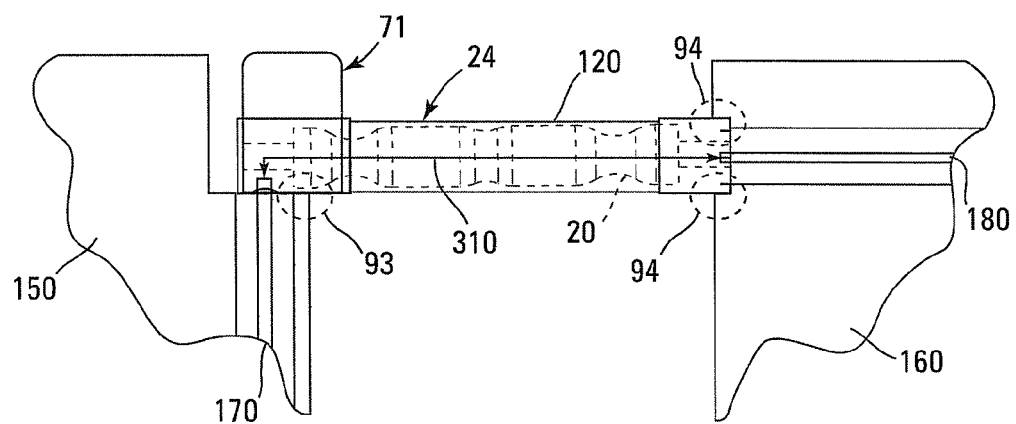
FIG. 7B illustrates the operably positioned conductive sleeve, device, first radio frequency device and second radio frequency device of FIG. 7A according to an embodiment of the present invention.

FIG. 7A illustrates an exploded view of relative positions of a conductive sleeve 24, a device 20, a first radio frequency device 150 and a second radio frequency device 160 according to an embodiment of the present invention. FIG. 7B illustrates the operably positioned conductive sleeve 24, device 20, first radio frequency device 150 and second radio frequency device 160 of FIG. 7A according to an embodiment of the present invention. The device 20 is shown in outline as it is held within the sleeve 24. The first radio frequency device 150 includes an input/output connector 170. Other than the input/output connector 170, the first radio frequency device 150 is grounded. The second radio frequency device 160 includes an input/output connector 180. Other than the input/output connector 180, the second radio frequency device 160 is grounded. The second radio frequency device 160 includes feature 185 that conforms in shape and size to the second-end portion 132.

The securing bracket 71 clamps the first-end portion 130 (FIG. 7A) to the first radio frequency device 150 so that the input/output connector 170 extends through the hole 140 and contacts the device 20 while the outer-conductive surface 120 of the conductive sleeve 24 is grounded to the first radio frequency device 150. The second-end portion 132 (FIG. 7A) of the sleeve 24 fits within the feature 185 (FIG. 7A) of the second radio frequency device 160 so that the input/output connector 180 contacts the device 20 and outer-conductive surface 120 of the conductive sleeve 24 is grounded to the second radio frequency device 160. When the input/output connector 170 and the input/output connector 180 contact the device 20, a radio frequency path 310 or an electrical current path 310 is established.

The conductive sleeve 24 is adapted to contact the ground in the first radio frequency device 150 in the grounded contact region generally indicated as 93 (FIG. 7B) in proximity to the radio frequency path 310 or the electrical current path 310. Likewise, the conductive sleeve 24 is adapted to contact the ground in the second radio frequency device 160 in the grounded contact region generally indicated as 94 (FIG. 7B) in proximity to the radio frequency path 310 or the electrical current path 310.

In this manner, the device 20 is retained in the conductive sleeve 24 while the outer-conductive surface 120 of the conductive sleeve 24 is grounded to the first radio frequency device 150 and the second radio frequency device 160 and the device 20 is electrically contacting the first radio frequency device 150 and the second radio frequency device 160.

FIG. 8A illustrates an exploded view of relative positions of a conductive sleeve 28, a device 20, a first radio frequency device 255 and a second radio frequency device 160 according to an embodiment of the present invention. FIG. 8B illustrates the operably positioned conductive sleeve 28, device 20, first radio frequency device 255 and second radio frequency device 160 of FIG. 8A according to an embodiment of the present invention.

The device 20 is shown in outline as it is held within the conductive sleeve 28. The conductive sleeve 28 includes a first-end portion 330, a second-end portion 132 and a main body portion 134. The first-end portion 330 is similar to the second-end portion 132 as described above with reference to FIGS. 4A-4C and includes flanges 135. The first-end portion 330 does not include a hole that extends from the outer-conductive surface 120 of the conductive sleeve 28 to an inner surface 121 of the conductive sleeve 28.

The first radio frequency device 255 includes an input/output connector 270 and a feature 285 that conforms in shape and size to the first-end portion 330. Other than the input/output connector 270, the first radio frequency device 255 is grounded. The second radio frequency device 160 is as described above with reference to FIGS. 7A-7B.

The first-end portion 330 (FIG. 8A) of the conductive sleeve 28 fits within the feature 285 (FIG. 8A) of the first radio frequency device 255. When the input/output connector 270 contacts the device 20, the outer-conductive surface 120 of the conductive sleeve 28 is grounded to the first radio frequency device 255.

The second-end portion 132 (FIG. 8A) of the conductive sleeve 28 fits within the feature 185 (FIG. 8A) of the second radio frequency device 160. When the input/output connector 180 contacts the device 20, the outer-conductive surface 120 of the conductive sleeve 28 is grounded to the second radio frequency device 160. When the input/output connector 270 and the input/output connector 180 simultaneously contact the device 20, a radio frequency path 310 or an electrical current path 310 is established.

The conductive sleeve 28 is adapted to contact the ground in the first radio frequency device 255 in the grounded contact region generally indicated as 93 (FIG. 8B) in proximity to the radio frequency path 310 or the electrical current path 310. The grounded contact region 93 is also referred to here as "first ground contact 93." Likewise, the conductive sleeve 28 is adapted to contact the ground in the second radio frequency device 160 in the grounded contact region generally indicated as 94 (FIG. 8B) in proximity to the radio frequency path 310 or the electrical current path 310. The grounded contact region 94 is also referred to here as "second ground contact 94."

In this manner, the device 20 is retained in the conductive sleeve 28 while the outer-conductive surface 120 of the conductive sleeve 28 is grounded to the first radio frequency device 255 and the second radio frequency device 160 and the device 20 is electrically contacting the first radio frequency device 255 and the second radio frequency device 160. In one implementation of this embodiment, the device 20 a third radio frequency device 20. In this case, the inner passageway 122 in the conductive sleeve 24 is adapted to receive the third radio frequency device 20. The conductive sleeve 24 shields the third radio frequency device 20 when the outer-conductive surface 120 is operably attached to the first ground contact 93 in the first radio frequency device 255 and is operably attached to the second ground contact 94 in the second radio frequency device 160.

FIG. 9A illustrates an exploded view of relative positions of a conductive sleeve 24, device 20, and at least a first radio frequency device 400 according to an embodiment of the present invention. FIG. 9B illustrates the operably positioned conductive sleeve 24, device 20 and at least first radio frequency device 400 of FIG. 9A according to an embodiment of the present invention.

The device 20 is shown in outline as it is held within the conductive sleeve 24. The conductive sleeve 24 includes a first-end portion 130, a second-end portion 132 and a main body portion 134 as describe above with reference to FIGS. 3A-3D. The radio frequency device 400 includes a first input/output connector 420 positioned perpendicular to a second input/output connector 410. The second input/output connector 410 projects into a feature 185 that conforms in shape and size to the second-end portion 132. Other than the first input/output connector 420 and the second input/output connector 410, the radio frequency device 400 is grounded.

In one implementation of this embodiment, the radio frequency device 400 is two radio frequency devices. In this case, the first input/output connector 420 is correlated with a first radio frequency device in the radio frequency device 400 and the second input/output connector 410 is correlated with a second radio frequency device in the radio frequency device 400. For the discussion related to FIGS. 9A and 9B, the "at least a first radio frequency device 400" is referred to as "radio frequency device 400."

The second-end portion 132 (FIG. 9A) of the conductive sleeve 24 fits within the feature 185 (FIG. 9A) of the radio frequency device 400. The input/output connector 410 contacts the device 20. The outer-conductive surface 120 of the conductive sleeve 24 is grounded to the radio frequency device 400. The securing bracket 71 clamps the first-end portion 130 (FIG. 9A) to the radio frequency device 400 at the input-output connector 420. The input/output connector 420 extends through the hole 140 and contacts the device 20 while the outer-conductive surface 120 of the conductive sleeve 24 is grounded to the radio frequency device 400.

When the input/output connector 420 and the input/output connector 410 simultaneously contact the device 20, a radio frequency path 310 or an electrical current path 310 is established. The conductive sleeve 24 is adapted to contact the ground in the radio frequency device 400 in the grounded contact region generally indicated as 93 (FIG. 9B) in proximity to the radio frequency path 310 or the electrical current path 310 at the first-end portion 130. Likewise, the conductive sleeve 24 is adapted to contact the ground in the radio frequency device 400 in the grounded contact region generally indicated as 94 (FIG. 9B) in proximity to the radio frequency path 310 or the electrical current path 310 at the second-end portion 132.

In this manner, the device 20 is retained in the conductive sleeve 24 while the outer-conductive surface 120 of the conductive sleeve 24 is grounded to the radio frequency device 400. In the embodiment in which the radio frequency device 400 is two radio frequency devices, the device 20 is a third radio frequency device 20 that is shielded from both the first radio frequency device and the second radio frequency device while all three radio frequency devices are operational. In this case, the inner passageway 122 in the conductive sleeve 24 is adapted to receive the third radio frequency device 20. The conductive sleeve 24 shields the third radio frequency device 20 when the outer-conductive surface 120 is operably attached to the first ground contact 93 in the first radio frequency device and is operably attached to the second ground contact 94 in the second radio frequency device.

Figure 10:
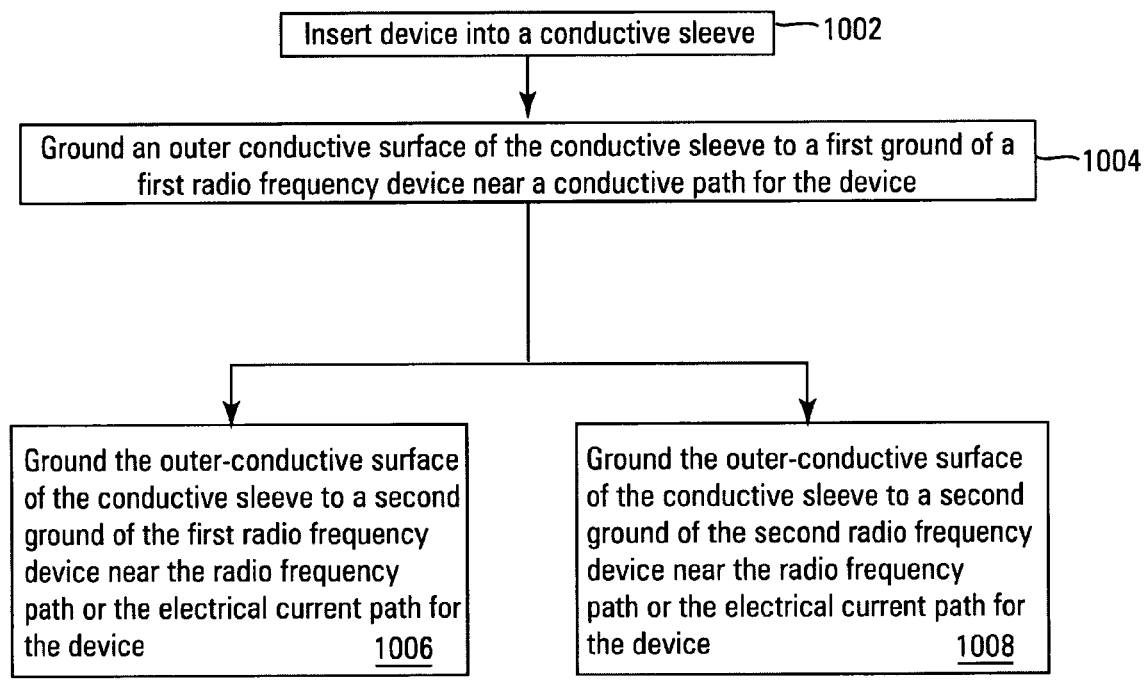
FIG. 10 is a flow diagram of one embodiment of a method to electrically isolate two devices.

FIG. 10 is a flow diagram 1000 of one embodiment of a method to electrically isolate two devices. The following discussion of flow diagram 1000 is related to the implementations of the present invention as shown in FIGS. 7A-9B. The flow diagram 1000 is applicable to other embodiments of the radio frequency assemblies, securing brackets and conductive sleeves.

At block 1002, a device 20 is inserted into a conductive sleeve 24 or 28 (FIG. 7A or 8A, respectively). At block 1004, an exterior surface, such as outer-conductive surface 120 of the conductive sleeve 24, is grounded to the first ground 93 of a first radio frequency device near a conductive path, such as radio frequency path 130 or electrical current path 130, for the device 20. The first radio frequency device can be first radio frequency device 150 as shown in FIGS. 7A and 7B. Likewise, the first radio frequency device can be first radio frequency device 255 as shown in FIGS. 8A and 8B. Additionally, the first radio frequency device can be radio frequency device 400 as shown in FIGS. 9A and 9B.

If the first radio frequency device is a single radio frequency device 400 as shown in FIGS. 9A and 9B, the flow proceeds to block 1006. If the first radio frequency device is first radio frequency device 150 as shown in FIGS. 7A and 7B, the flow proceeds to block 1008. If the first radio frequency device is first radio frequency device 255 as shown in FIGS. 8A and 8B, the flow proceeds to block 1008. If the first radio frequency device is a first of two radio frequency devices that comprise the radio frequency device 400 as shown in FIGS. 9A and 9B, the flow proceeds to block 1008.

At block 1006, the exterior surface 120 of the conductive sleeve 24 (FIG. 9B) is grounded to the second ground 94 of the radio frequency device 400 near the radio frequency path 310 or the electrical current path 310 for the device 20.

At block 1008, the exterior surface 120 of the conductive sleeve 24 or 28 (FIG. 7B or 8B, respectively) is grounded to the second ground 94 of a second radio frequency device 160 near the radio frequency path 130 or the electrical current path 130 for the device 20.

Figure 11:
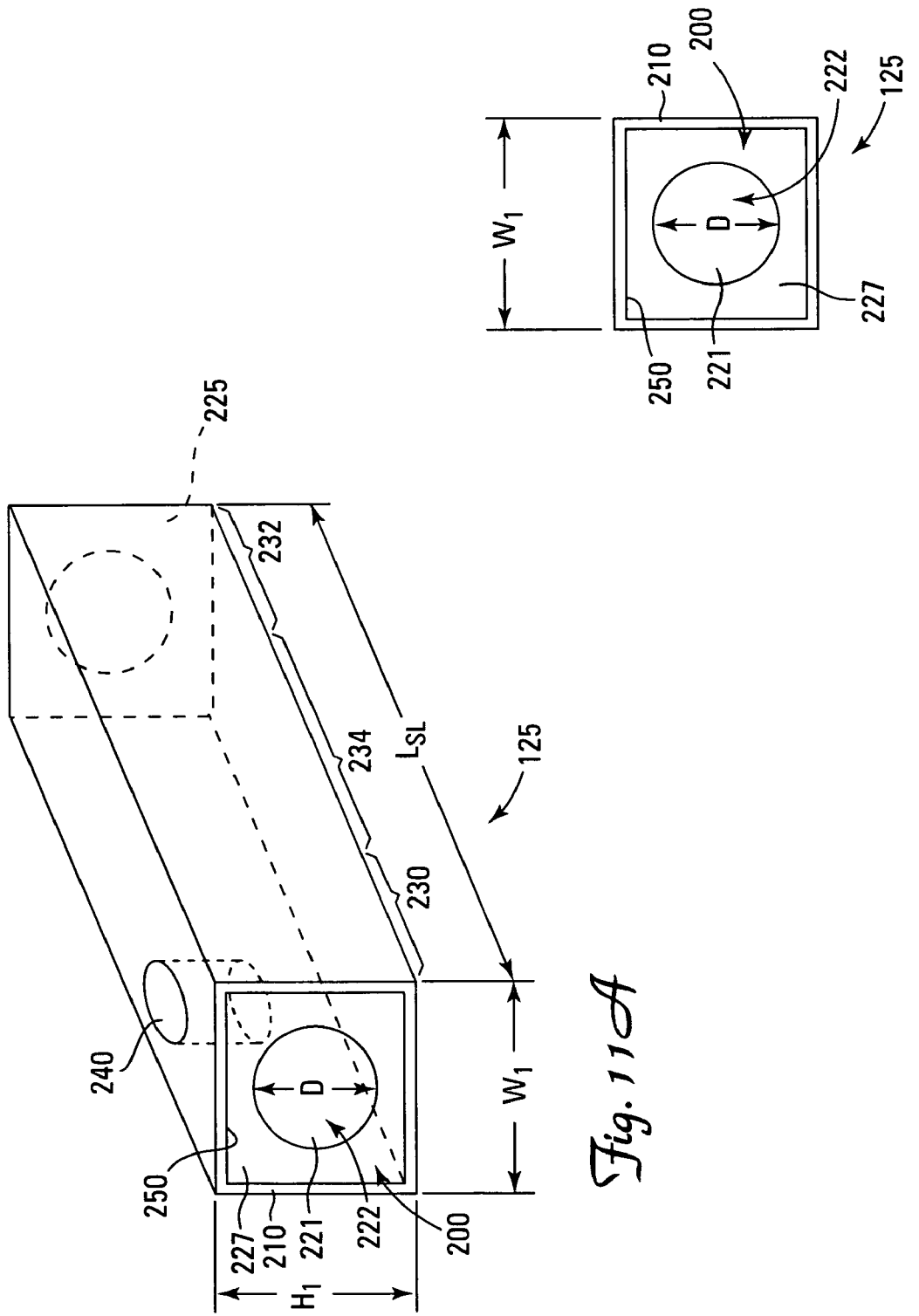
FIGS. 11A and 11B illustrate views of a conductive sleeve operable according to an embodiment of the present invention.

FIGS. 11A and 11B illustrate views of a conductive sleeve 125 according to an embodiment of the present invention. FIG. 11A is an oblique view of the conductive sleeve 125. FIG. 11B illustrates an end view of the conductive sleeve 125 from the first end 227.

The conductive sleeve 125 includes a non-conductive material 200 with an inner passageway 222 extending through the length $L_{SL}$ (FIG. 11A) of the non-conductive material 200 from that extends from a second end 225 to a first end 227. A conductive layer 210 is formed on the exterior surface 250 of the non-conductive material 200. In this illustrated embodiment, the outer-conductive surface 210 is rectangular. Other shapes for the outer-conductive surface are possible. The inner passageway 222 is designed to receive a first radio frequency device, such as a device 20 (FIG. 3). As shown in FIGS. 11A and 11B, the inner passageway 222 has an inner diameter D. In one implementation of this embodiment, the inner diameter varies along the length $L_{SL}$ of the inner passageway 222.

The conductive sleeve 125 includes a first-end portion 230, a second-end portion 232 and a main body portion 234. The first-end portion 230 is near the first end 227. The first-end portion 230 includes a hole 240 that extends through the outer-conductive surface 210 and the non-conductive material 200 to an inner surface 221 of the conductive sleeve 125.

The width $W_1$ of the conductive sleeve 125 is less than the width W (FIG. 2B) of the cavity 90. Likewise, the height $H_1$ of the conductive sleeve 125 is less than the width W (FIG. 2B) of the cavity 90. The length $L_{SL}$ of the conductive sleeve 125 is less than the length L (FIG. 2B) of the cavity 90 so that the conductive sleeve 125 fits completely within the cavity 90 of the first radio frequency device 40.

When the conductive sleeve 125 is inserted into the cavity 90 (FIGS. 1A and 1B), the second end 225 of the conductive sleeve 125 including the conductive layer 210 is pushed against the flat surface 46 (FIG. 1B) of the first radio frequency device 40. The surface 46 of the first radio frequency device 40 is a grounded surface and the outer-conductive surface of the conductive sleeve 24 is grounded when the second end 225 of the conductive sleeve 125 including the conductive layer 210 is pushed against the flat surface 46. In this manner, the conductive layer 210 forms a stable first ground contact with the first radio frequency device 40 when the sleeve 125 in inserted in the cavity 90.

In one implementation of this embodiment as shown in FIGS. 1A and 1B, the height and width dimensions of the main body portion 234 equals the height and width dimensions of the first-end portion 230 and the second-end portion 232. In another implementation of this embodiment of the conductive sleeve 125, the height and width dimensions of the main body portion 234 differ from the height and width dimensions of the first-end portion 230 and the second-end portion 232. As shown in FIG. 11A, conductive sleeve 125 does not include movable flanges at the second-end portion 232 of the conductive sleeve 125. In one implementation of this embodiment, the conductive sleeve 125 includes movable flanges at the second-end portion 232 of the conductive sleeve 125. In this case, the gap between the flanges is designed to accommodate the thickness of the flanges in order to allow the flanges to bend slightly to position the end faces parallel to the flat surface 46 (FIG. 1B) of the first radio frequency device 40.

In one implementation of this embodiment, the inner passageway 222 is cylindrical and extends through a length of a metallic form. In one embodiment of this implementation, the diameter D of the inner passageway is about 3 mils greater than a largest diameter of the device 20. In another implementation of this embodiment, the inner diameter varies along the length $L_{SL}$ of the inner passageway 222.

In the various implementations of embodiments of the conductive sleeves 24 and 125, the sleeves are formed from one of a metal cylinder, a metallic form including a passageway extending at least partially through a length of the metallic form, a metallic form including a cylindrical passageway extending at least partially through a length of the metallic form, a plastic form coated on an exterior surface with a metal layer and including a passageway extending at least partially through a length of the plastic form, a plastic form coated on an exterior surface with a metal layer and including a cylindrical passageway extending at least partially through a length of the metal-coated plastic form, and a plastic cylinder coated on an exterior surface with a metal layer. Other shapes are possible. By way of example and not by way of limitation, the term "form" includes a variety of shapes including rectangular, rhombic, and cylindrical shapes that may be asymmetric about one or more axes of the form and that may have a non-uniform thickness along one or more lengths of the form.

Figure 12:
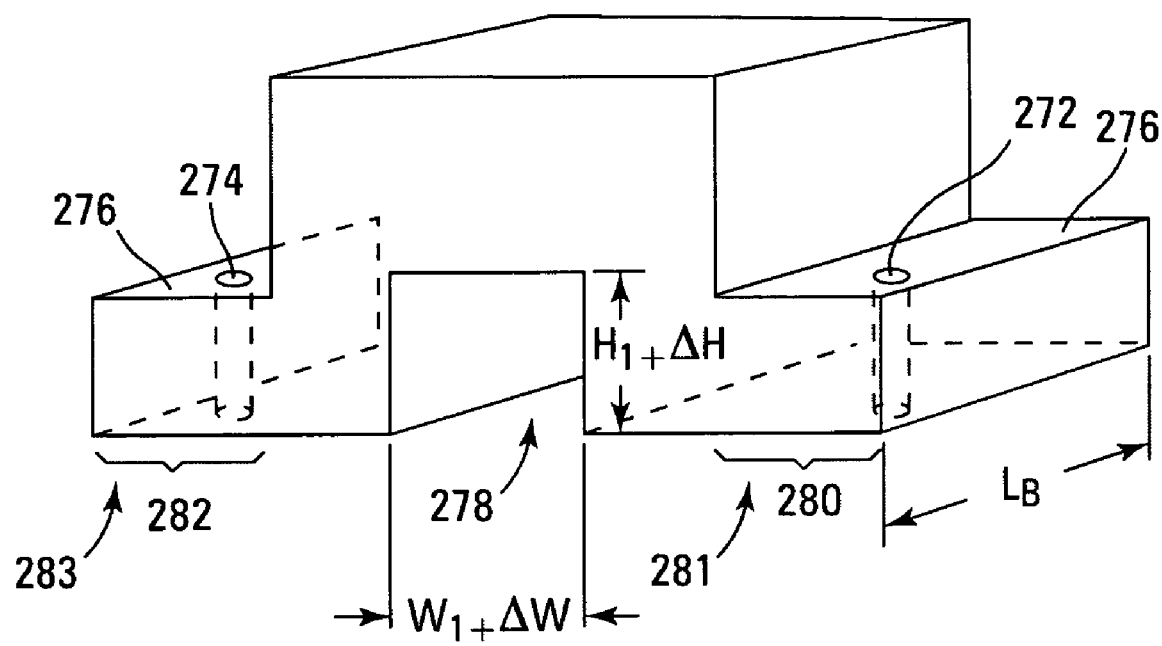
FIG. 12 illustrates an oblique view of a securing bracket operable to attach a device to a first radio frequency device according to an embodiment of the present invention.

FIG. 12 illustrates an oblique view of a securing bracket 271 operable to ground the device 20 with the first radio frequency device 40 according to an embodiment of the present invention.

The securing bracket 271 includes an inset 278 having a shape that conforms to the shape of the outer-conductive surface 210 at a first-end portion 230 of the conductive sleeve 125 (FIGS. 11A and 11B). As shown in FIG. 12, the inset 278 is a rectangular inset having a width of dimension $W_1+\Delta W$ and a depth of dimension $H_1+\Delta H$. The dimension $\Delta W$ is small with respect to $W_1$ and the dimension $\Delta H$ is small with respect to $H_1$. Thus, the inset 278 conforms to the outer-conductive surface 210 at a first-end portion 230 of the conductive sleeve 125.

The inset 278 separates the body of the securing bracket 271 into a first-side region 280 positioned at a first side 281 of the inset 278 and a second-side region 282 positioned at a second side 283 of the inset 278. The securing bracket 271 includes holes 272 and 274, which receive attachment fixtures, such as screws, attachment pins and the like. The attachment fixtures attach the securing bracket 271 to the first radio frequency device 40. The hole 272 is located in the first-side region 280 of the securing bracket 271. In another implementation of this embodiment, the securing bracket 271 is strap. The securing bracket 271 is formed from a metals and/or plastics. Other materials are possible.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An apparatus comprising:
  a conductive sleeve including an outer-conductive surface and an inner passageway that extends from a first end at least partially to a second end, the passageway adapted to receive and shield a device that provides at least one of a radio frequency path and an electrical current path between a first input/output connector and a second input/output connector, wherein the first input/output connector makes contact with the device through a first opening of the conductive sleeve, and the second input/output connector makes contact with the device through a second opening in the conductive sleeve, wherein the sleeve further comprises a plurality of movable flanges at at least the first end, the plurality of movable flanges spaced about a circumference of the first end of the conducting sleeve, wherein a gap between each of the plurality of movable flanges limits inward bending of each of the plurality of moveable flanges, the plurality of flanges configured to couple the outer-conductive surface to a ground.

2. The apparatus of claim 1, further comprising a securing bracket operable to attach the conductive sleeve to a grounded radio frequency device, wherein the outer-conductive surface contacts a ground in the grounded radio frequency device.

3. The apparatus of claim 1, wherein the device is one of an active electrical circuit, a passive electrical circuit, an active electro-optical circuit, a passive electro-optical circuit, an electrical element, an optical element, a radio frequency device, band pass filter, a band stop, a low pass filter, a notch filter, a printed circuit board, radio frequency traces, lasers, light emitting diodes, a straight pin and combinations thereof.

4. The apparatus of claim 1, wherein the inner passageway extends from the first end to the second end.

5. The apparatus of claim 1, wherein the sleeve is adapted to contact a first ground contact in a first radio frequency device, wherein the first ground contact is in proximity to the at least one of the radio frequency path and the electrical current path.

6. The apparatus of claim 5, wherein the sleeve is further adapted to contact a second ground contact in the first radio frequency device, wherein the second ground contact is in proximity to the at least one of the radio frequency path and the electrical current path.

7. The apparatus of claim 5, wherein the sleeve is adapted to contact a second ground contact in a second radio frequency device, wherein the second ground contact is in proximity to the at least one of the radio frequency path and the electrical current path.

8. The apparatus of claim 1, wherein the sleeve further comprises:
a first-end portion near the first end, the first-end portion partially encircled by a securing bracket, the securing bracket operable to attach the conductive sleeve to a radio frequency device, wherein a ground contact in the radio frequency device is in contact with the outer-conductive surface and in proximity to the at least one of the radio frequency path and the electrical current path.

9. The apparatus of claim 8, wherein the ground contact is a first ground contact, and wherein the sleeve further comprises:
movable flanges at the second end, the flanges enabled to stably contact a second ground contact in the radio frequency device, wherein the second ground contact is in contact with the outer-conductive surface and in proximity to the at least one of the radio frequency path and the electrical current path.

10. The apparatus of claim 1, wherein the sleeve is formed from one of a metal cylinder, a metallic form including a passageway extending at least partially through a length of the metallic form, a metallic form including a cylindrical passageway extending at least partially through a length of the metallic form, a plastic form coated on an exterior surface with a metal layer and including a passageway extending at least partially through a length of the plastic form, a plastic form coated on an exterior surface with a metal layer and including a cylindrical passageway extending at least partially through a length of the metal-coated plastic form, a plastic cylinder coated on an exterior surface with a metal layer, a rectangular plastic form coated on an exterior surface with a metal layer wherein a passageway extends at least partially through a length of the metal-coated rectangular plastic form and a rectangular plastic form coated on an exterior surface with a metal layer wherein a cylindrical passageway extends at least partially through a length of the metal-coated rectangular plastic form.

11. The apparatus of claim 1, wherein the sleeve further comprises:
a non-conductive material with the inner passageway extending through a length of the non-conductive material; and
a conductive layer formed on an exterior surface of the non-conductive material.

12. The apparatus of claim 1, wherein the inner passageway is a cylindrical inner passageway.

13. The apparatus of claim 1, wherein the device is a radio frequency device.

14. An apparatus comprising:
a conductive sleeve including an outer-conductive surface and an inner passageway that extends from a first end at least partially to a second end, the passageway adapted to receive and shield a device that provides at least one of a radio frequency path and an electrical current path, wherein the sleeve further comprises movable flanges at least one end, the flanges enabled to stably contact a ground contact;
wherein the sleeve further comprises a first-end portion near the first end, the first-end portion partially encircled by a securing bracket, the securing bracket operable to attach the conductive sleeve to a radio frequency device, wherein a ground contact in the radio frequency device is in contact with the outer-conductive surface and in proximity to the at least one of the radio frequency path and the electrical current path;
wherein the sleeve further comprises a hole in a portion of the sleeve, the hole extending from the outer-conductive surface of the sleeve to an inner surface of the sleeve, wherein an input/output connector extends through the hole, wherein the input/output connector electrically connects to the device.

15. An apparatus comprising:
a conductive sleeve including an outer-conductive surface and an inner passageway that extends from a first end at least partially to a second end, the passageway adapted to receive and shield a device that provides at least one of a radio frequency path and an electrical current path, wherein the sleeve further comprises movable flanges at least one end, the flanges enabled to stably contact a ground contact;
wherein the sleeve further comprises a first-end portion near the first end, the first-end portion partially encircled by a securing bracket, the securing bracket operable to attach the conductive sleeve to a radio frequency device, wherein a ground contact in the radio frequency device is in contact with the outer-conductive surface and in proximity to the at least one of the radio frequency path and the electrical current path;
wherein the securing bracket comprises an inset having a shape that conforms to a shape of the outer-conductive surface at the first-end portion of the sleeve, wherein the inset contacts the first-end portion of the outer-conductive surface in order to hold the conductive sleeve in the radio frequency device.

16. An apparatus comprising:
a conductive sleeve including an outer-conductive surface and an inner passageway that extends from a first end at least partially to a second end, the passageway adapted to receive and shield a device that provides at least one of a radio frequency path and an electrical current path, wherein the sleeve further comprises movable flanges at least one end, the flanges enabled to stably contact a ground contact;
wherein the sleeve further comprises a first-end portion near the first end, the first-end portion partially encircled by a securing bracket, the securing bracket operable to attach the conductive sleeve to a radio frequency device, wherein a ground contact in the radio frequency device is in contact with the outer-conductive surface and in proximity to the at least one of the radio frequency path and the electrical current path;
wherein the ground contact is a first ground contact, and wherein the sleeve further comprises movable flanges at the second end, the flanges enabled to stably contact a second ground contact in the radio frequency device wherein the second ground contact is in contact with the outer-conductive surface and in proximity to the at least one of the radio frequency path and the electrical current path.

17. An apparatus comprising:
a conductive sleeve including an outer-conductive surface and an inner passageway that extends from a first end at least partially to a second end, the passageway adapted to receive and shield a device that provides at least one of a radio frequency path and an electrical current path, wherein the sleeve further comprises movable flanges at least one end, the flanges enabled to stably contact a ground contact;
wherein the sleeve further comprises movable flanges at the first end, the flanges enabled to stably contact a first ground contact in a first radio frequency device, wherein the first ground contact is in contact with the outer-conductive surface and in proximity to the at least one of the radio frequency path and the electrical current path; and
movable flanges at the second end, the flanges enabled to stably contact a second ground contact in a second radio frequency device, wherein the second ground contact is in contact with the outer-conductive surface and in proximity to the at least one of the radio frequency path and the electrical current path.

18. A method to electrically isolate a device, the method comprising:
inserting the device into a conductive sleeve having a first opening for connecting the device to a first input/output connector and a second opening for connecting the device to a second input/output connector;
grounding an outer-conductive surface of the conductive sleeve to a first ground of a first radio frequency device near at least one of a radio frequency path and an electrical current path for the device; and
grounding the outer-conductive surface of the conductive sleeve to a second ground of a second radio frequency device near at least one of the radio frequency path and the electrical current path for the device,
wherein the device is electrically isolated from the outer-conductive surface of the conductive sleeve; and
wherein the grounding is implemented using one of a plurality of movable flanges positioned around a first end of the conductive sleeve.

19. A method to electrically isolate a second radio frequency device, the method comprising:
inserting a conductive sleeve into a cavity of a first radio frequency device, the conductive sleeve operable to hold the second radio frequency device within an inner passageway of the conductive sleeve; and
grounding the conductive sleeve to a ground of the first radio frequency device using one of a plurality of movable flanges positioned on a first end of the conductive sleeve, wherein a gap between each of the plurality of movable flanges limits inward bending of each of the plurality of moveable flanges.

20. The method of claim 19, further comprising:
securing the conductive sleeve by a securing bracket to the first radio frequency device.

21. The method of claim 20, the method further comprising:
inserting the second radio frequency device into the conductive sleeve; and
aligning the second radio frequency device to at least one input/output connector, wherein the input/output connector is in electrical contact with the second radio frequency device.

22. A system to shield a device, the system comprising:
means for grounding a conductive sleeve with a first radio frequency device, the means for grounding including a plurality of movable flanges about a circumference of a first end of the conducting sleeve for contacting a ground contact, wherein a gap between each of the plurality of movable flanges limits inward bending of each of the plurality of moveable flanges; and
means for retaining the device within the conductive sleeve.

23. The system of claim 22, the system further comprising:
means for electrically contacting the device with the first radio frequency device.

24. The system of claim 23, the system further comprising:
means for grounding the conductive sleeve with a second radio frequency device; and
means for electrically contacting the device with the second radio frequency device.

25. A method to electrically isolate a device, the method comprising:
inserting a device into a conductive sleeve, the conductive sleeve having movable flanges at a first end of a first-end portion and at a second end of a second-end portion;
fitting the first-end portion into a first feature of a radio frequency device, wherein the first feature conforms in shape and size to the first-end portion;
fitting the second-end portion into a second feature of the radio frequency device, wherein the second feature conforms in shape and size to the second-end portion; and
simultaneously contacting the device to an input/output connector in the first feature and to an input/output connector in the second feature based on the fittings, wherein one of a radio frequency path or an electrical current path is established.

26. A conductive sleeve for electrically isolating a device from a radio frequency device, the conductive sleeve comprising:
an outer-conductive surface;
an inner passageway that extends from a first end to a second end, the passageway adapted to receive and shield the device that provides at least one of a radio frequency path and an electrical current path;
a first-end portion near the first end, the first-end portion able to be partially encircled by a securing bracket in order to attach the conductive sleeve to the radio frequency device, wherein a first ground contact in the radio frequency device is in contact with the outer-conductive surface and in proximity to the at least one of the radio frequency path and the electrical current path, and movable flanges at the second end, the flanges enabled to stably contact a second ground contact in the radio frequency device, wherein the second ground contact is in contact with the outer-conductive surface and in proximity to the at least one of the radio frequency path and the electrical current path.

27. A conductive sleeve for electrically isolating a device from a radio frequency device, the conductive sleeve comprising:

an outer-conductive surface;

an inner passageway that extends from a first end to a second end, the passageway adapted to receive and shield the device that provides at least one of a radio frequency path and an electrical current path;

movable flanges at the first end, the flanges enabled to stably contact a first ground contact in the radio frequency device, wherein the first ground contact is in contact with the outer-conductive surface and in proximity to the at least one of the radio frequency path and the electrical current path; and movable flanges at the second end, the flanges enabled to stably contact a second ground contact in the radio frequency device, wherein the second ground contact is in contact with the outer-conductive surface and in proximity to the at least one of the radio frequency path and the electrical current path.

28. The apparatus of claim 27, wherein the conductive sleeve is formed from one of a metal cylinder, a metallic form including a passageway extending at least partially through a length of the metallic form, a metallic form including a cylindrical passageway extending at least partially through a length of the metallic form, a plastic form coated on an exterior surface with a metal layer and including a passageway extending at least partially through a length of the plastic form, a plastic form coated on an exterior surface with a metal layer and including a cylindrical passageway extending at least partially through a length of the metal-coated plastic form, a plastic cylinder coated on an exterior surface with a metal layer, a rectangular plastic form coated on an exterior surface with a metal layer wherein a passageway extends at least partially through a length of the metal-coated rectangular plastic form and a rectangular plastic form coated on an exterior surface with a metal layer wherein a cylindrical passageway extends at least partially through a length of the metal-coated rectangular plastic form.

* * * * *

UNITED STATES PATENT AND TRADEMARK OFFICE
CERTIFICATE OF CORRECTION

PATENT NO.         : 7,841,899 B2
APPLICATION NO.    : 11/370557
DATED              : November 30, 2010
INVENTOR(S)        : Taskila et al.

It is certified that error appears in the above-identified patent and that said Letters Patent is hereby corrected as shown below:

Claim 16, Column 15, Line 7, please insert --at-- after flanges at

Claim 17, Column 15, Line 32, please insert --at-- after flanges at

Signed and Sealed this
Tenth Day of April, 2012

David J. Kappos
*Director of the United States Patent and Trademark Office*